(12) United States Patent
Barty et al.

(10) Patent No.: US 6,873,454 B2
(45) Date of Patent: Mar. 29, 2005

(54) HYBRID CHIRPED PULSE AMPLIFICATION SYSTEM

(75) Inventors: Christopher P. J. Barty, Hayward, CA (US); Igor Jovanovic, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 221 days.

(21) Appl. No.: 10/304,262

(22) Filed: Nov. 26, 2002

(65) Prior Publication Data

US 2003/0112494 A1 Jun. 19, 2003

Related U.S. Application Data

(60) Provisional application No. 60/340,304, filed on Dec. 13, 2001, and provisional application No. 60/341,380, filed on Dec. 13, 2001.

(51) Int. Cl.$^7$ .............................................. G02F 1/39
(52) U.S. Cl. ...................................................... 359/330
(58) Field of Search ................................. 359/326–332

(56) References Cited

U.S. PATENT DOCUMENTS

| | | | |
|---|---|---|---|
| 5,047,668 A | 9/1991 | Bosenberg | |
| 5,400,350 A | 3/1995 | Galvanauskas | |
| 5,696,782 A | 12/1997 | Harter et al. | |
| 5,862,287 A | 1/1999 | Stock et al. | |
| 6,181,463 B1 | 1/2001 | Galvanauskas et al. | |
| 6,198,568 B1 | 3/2001 | Galvanauskas et al. | |
| 6,208,458 B1 | 3/2001 | Galvanauskas et al. | |
| 6,282,014 B1 | 8/2001 | Long | |
| 6,320,886 B1 | 11/2001 | Dawber et al. | |
| 6,334,011 B1 | 12/2001 | Galvanauskas et al. | |
| 2002/0001321 A1 | 1/2002 | Perry | |

OTHER PUBLICATIONS

Ross et al, "Generation Of Terawatt Pulses By Use Of Optical Parametric Chirped Pulse Amplification", Applied Optics, vol. 39, No. 15, May 2000, pp. 2422–2427.*

Ross et al, "The Prospects For Ultrashort Pulse Duration And Ultrahigh Intensity Using Optical Parametric Chirped Pulse Amplifiers", Optics Communications, vol. 144, Dec. 1997, pp. 125–133.*

Mark A. Dreger, et al., "Coupled thermal and nonlinear effects for beam propagation in anisotropic crystals," SPIE, vol. 2145, pp. 254–269 (16 pages), 0–8194–1440, 9/94.

John Collier, et al., "Evaluation of an ultrabroadband high-gain amplification technique for chirped pulse amplification facilities," Applied Optics, vol. 38, No. 36, pp. 7486–7493, (8 pages), Dec. 20, 1999.

David Eimerl, "High Average Power Harmonic Generation," IEEE Journal of Quantum Electronics, vol. QE–23, No. 5, pp. 575–592 (18 pages), May 1987.

David Eimerl, "Frequency conversion materials from a device perspective," SPIE vol. 681, Laser and Nonlinear Optical Materials, pp. 2–5 (4 pages), 1986.

A. Dubietis, et al., "Powerful femtosecond pulse generation by chirped and stretched pulse parametric amplification in BBO crystal," Optics Communications 88, pp. 437–440 (4 pages), Apr. 1, 1992.

* cited by examiner

Primary Examiner—John D. Lee
(74) Attorney, Agent, or Firm—Eddie E. Scott; Alan H. Thompson

(57) ABSTRACT

A hybrid chirped pulse amplification system wherein a short-pulse oscillator generates an oscillator pulse. The oscillator pulse is stretched to produce a stretched oscillator seed pulse. A pump laser generates a pump laser pulse. The stretched oscillator seed pulse and the pump laser pulse are directed into an optical parametric amplifier producing an optical parametric amplifier output amplified signal pulse and an optical parametric amplifier output unconverted pump pulse. The optical parametric amplifier output amplified signal pulse and the optical parametric amplifier output laser pulse are directed into a laser amplifier producing a laser amplifier output pulse. The laser amplifier output pulse is compressed to produce a recompressed hybrid chirped pulse amplification pulse.

68 Claims, 2 Drawing Sheets

HYBRID CHIRPED PULSE AMPLIFICATION SYSTEM

CROSS-REFERENCE TO RELATED APPLICATIONS

This application claims the benefit of U.S. Provisional Application No. 60/340,304 filed Dec. 13, 2001 entitled "A Hybrid Optical Parametric—Ti:sapphire Chirped Pulse Amplification System" which is incorporated herein by this reference. This application also claims the benefit of U.S. Provisional Application No. 60/341,380 filed Dec. 13, 2001 entitled "Nondegenerate Optical Parametric Chirped Pulse Amplifier" which is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to optical parametric chirped pulse amplification and more particularly to a hybrid chirped pulse amplification system.

2. State of Technology

U.S. Pat. No. 5,400,350 for a method and apparatus for generating high energy ultrashort pulses to Almantas Galvanauskas, issued Mar. 21, 1995 provides the following background information, "Both semiconductor sources (e.g., diode) and fiber sources are known which can produce ultrashort energy pulses having sub-picosecond pulse durations. Although these energy sources can provide reliable, robust operation in a compact, cost-effective manner, their inability to produce pulse energies comparable to those of large frame solid-state sources has limited their practical use."

U.S. Pat. No. 2002/0001321 for an ultrashort-pulse laser machining system employing a parametric amplifier to Michael D. Perry, published Jan. 3, 2002 provides the following background information, "Bulk optical parametric amplifiers have not been considered to date for moderate to high average power, ultrashort-pulse applications. The present optical parametric amplifier system does not rely on quasi-phase matching and can achieve both high average power and high gain for broad bandwidth chirped-pulses from a single or double stage system. By relying on parametric conversion rather than conventional laser amplification, there is no residual energy left within the gain medium. As a result, there are negligible thermal gradients and hence, one eliminates the depolarization and beam distortion problems that severely impact the beam quality and electrical to optical conversion efficiency of high average power ultrashort-pulse lasers. In addition to eliminating many of the thermal management problems associated with the high gain amplifier, the use of a parametric amplifier enables the production of the necessary ultrashort duration pulses from a simplified and more compact system. The pulses exiting the parametric amplifier may be compressed directly and used for machining or surgery or may be further amplified in a conventional laser amplifier to provide additional pulse energy before compression."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a hybrid chirped pulse amplification system that includes a short-pulse oscillator, a stretcher, a pump laser, an optical parametric amplifier, a laser amplifier, and a compressor. The stretcher is connected to the short-pulse oscillator and the optical parametric amplifier. The pump laser is also connected to the optical parametric amplifier. The optical parametric amplifier is connected to the laser amplifier. The laser amplifier is connected to the compressor. The short-pulse oscillator generates an oscillator pulse. The oscillator pulse is stretched to produce a stretched oscillator seed pulse. The pump laser generates a pump laser pulse. The stretched oscillator seed pulse and the pump laser pulse are directed into the optical parametric amplifier producing an optical parametric amplifier output amplified signal pulse and an optical parametric amplifier output unconverted pump pulse. The optical parametric amplifier output amplified signal pulse and the optical parametric amplifier output laser pulse are directed into the laser amplifier producing a laser amplifier output pulse. The laser amplifier output pulse is compressed to produce a recompressed hybrid chirped pulse amplification pulse.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
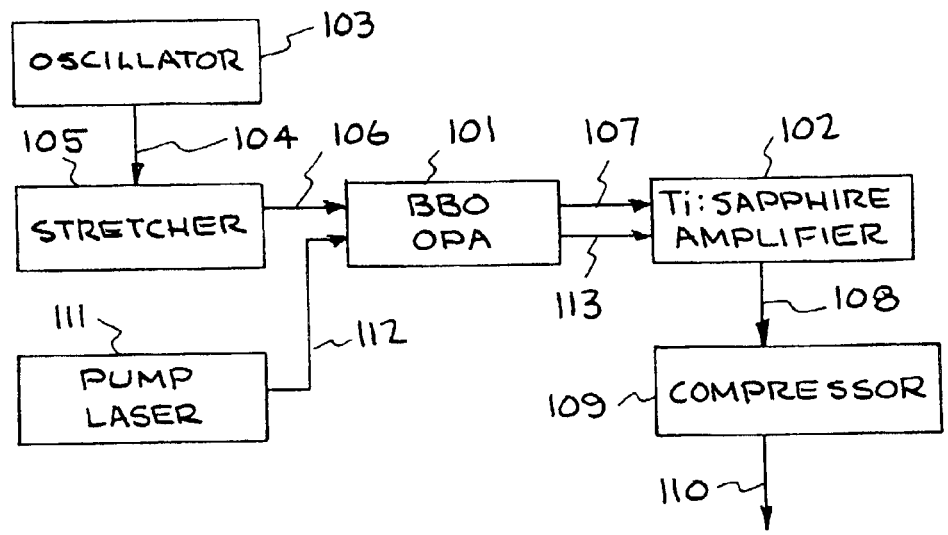
FIG. 1 illustrates an embodiment of a hybrid beta-barium borate (BBO)-Ti:sapphire CPA system constructed in accordance with the present invention.

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed.

The invention covers all modifications, equivalents, and alternatives falling within the spirit and scope of the invention as defined by the claims.

Referring now to FIG. 1, an embodiment of a hybrid BBO-Ti:sapphire CPA system constructed in accordance with the present invention is illustrated. The hybrid OPA-Ti:sapphire CPA system is designated generally by the reference numeral 100. The system 100 provides a chirped pulse amplification system that combines optical parametric amplification and laser amplification. High efficiency is achieved without the use of electro-optic modulators using a simple tabletop pump laser. The system 100, which can relax the requirements on the pump laser and still achieve high conversion efficiency from a standard commercial Q-switched laser, is illustrated.

Optical parametric amplification (OPA) is a technology that has a potential to replace regenerative amplification due to its large single pass gain obtainable in the nanosecond pump regime. Broad bandwidth associated with certain nonlinear mixing processes is particularly attractive in systems that amplify ultrashort pulses to high pulse energies through chirped pulse amplification (CPA). The use of OPA in CPA has been termed optical parametric chirped pulse amplification (OPCPA). Optical parametric chirped pulse amplification (OPCPA) has been used to amplify short laser pulses to high energies. A problem encountered when high conversion efficiency is desired in OPCPA is the stringent set of requirements on the pump laser pulse. The most problematic feature of tabletop commercial Q-switched lasers when they are applied to OPCPA is their spatio-temporal evolution and relatively long pulse width. While temporal multiplexing can improve the overall energy extraction, the temporal shape of the pump pulses is not top-hat unless additional pulse shaping is performed. Pulses obtained from unstable resonators are particularly problematic when used in OPCPA, as they exhibit complicated spatio-temporal evolution associated with radially variable build-up in the resonator and depletion of the laser medium.

The stringent set of requirements on the nanosecond pump laser that will ensure high pump to signal conversion efficiency is described as follows. The ideal pulse width of the pump pulse is given by the pulse width of the stretched seed pulse, which rarely exceeds 1 ns. The desired spatial and temporal profile of the pump laser is a top-hat, which minimizes spatial and temporal (spectral) modulation on the signal. Additionally, since most of the broadband processes occur in critically phase-matched birefringent crystals, the walk-off of the pump beam from the signal and idler beams inside the crystal limits the effective extraction area. The required beam quality of the pump laser is often close to diffraction limited, determined by the angular acceptance of the OPA. A temporal jitter between the seed and pump pulses smaller than the pump pulse width is necessary to allow overlap of pump and signal pulses and to avoid pulse-to-pulse variability of amplified signal spectrum.

Optical parametric chirped pulse amplification (OPCPA) is a process that can exhibit high conversion efficiency only when the seed and the pump are suitably shaped and well matched in space and time. The system 100 improves the extraction efficiency in an OPCPA system by using a Ti:sapphire amplifier for efficient energy extraction of the pump light which does not get converted in OPCPA. This hybrid system leads to pump to signal conversion efficiency of up to 50% and to significantly relaxed requirements for the pump laser. The system 100 has many uses, for example the system 100 can be used for a tabletop multi-terawatt laser systems based on commercial Q-switched pump lasers, without utilization of regenerative amplifiers. The system 100 can also be used for application of such systems to advance x-ray production, laser-based micromachining and high-field laser/matter interactions.

Referring again to FIG. 1, the structural components and operation of the system 100 will now be described. A short pulse oscillator 103 generates broadband seed pulses 104 spectrally centered near 800 nm, which are introduced into the pulse stretcher 105 which produces a ~ns group delay on the seed. A high-gain optical parametric amplifier 101 pumped by 532-nm pulses 112 from a commercial Q-switched pump laser 111 amplifies the stretched seed pulses 106 to the level determined by the temporal and spatial overlap between the stretched signal and the pump pulse.

The gain obtained from the BBO OPA 101 is typically comparable to the gain available from a standard regenerative amplifier pumped by the same laser. A unique feature of OPA that distinguishes it from laser gain media is the fact that no pump absorption and energy storage occurs in the OPA. As a result, the pump beam that remains unconverted in OPA 113 is available for pumping an additional Ti:sapphire laser amplifier 102. If a small temporal slice of the pump beam was converted in the BBO OPA 101, essentially all of the initial pump beam is available for pumping the final Ti:sapphire amplifier 102.

Amplification in Ti:sapphire is insensitive to the temporal modulation on the pump pulse after its use in OPA, because Ti:sapphire is a laser medium which stores total integrated pump energy. The final Ti:sapphire amplifier 102 pumped by the unconverted pump energy from BBO OPA 101 efficiently amplifies the pulse. The amplification in the laser stage 102 is accomplished by introducing the residual unconverted pump pulse 113 and the OPA amplified signal pulse 107 into the Ti:sapphire laser amplifier 102. OPA amplified signal pulse 107 is delayed with respect to the OPA unconverted pump pulse 113 by the pulse width of the residual unconverted pump pulse 113 prior to injection onto the laser amplification stage 102. The delay ensures that the OPA unconverted pump pulse 113 is fully absorbed in the laser amplifier 102 prior to the arrival of the OPA amplified signal pulse 107.

The amplified signal pulse 108 emerging from the Ti:sapphire laser amplifier 102 is recompressed in the pulse compressor 109. Recompressed amplified pulse 110 emerges from the pulse compressor 109.

Figure 2:
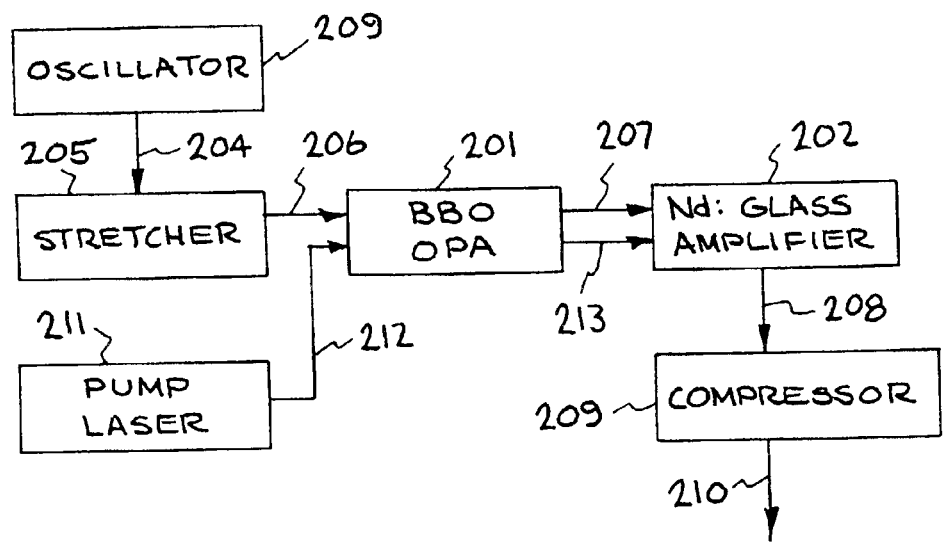
FIG. 2 illustrates another embodiment of a hybrid BBO-Nd:glass CPA system constructed in accordance with the present invention.

Referring now to FIG. 2, another embodiment of a system constructed in accordance with the present invention is illustrated. The system is designated generally by the reference numeral 200. The structural components and operation of the system 200 will now be described. A short pulse oscillator 203 generates broadband seed pulses 204 spectrally centered near 1053 nm, which are introduced into the pulse stretcher 205 which produces a ~ns group delay on the seed. A high-gain optical parametric amplifier 201 pumped by 532-nm pulses 212 from a commercial Q-switched pump laser 211 amplifies the stretched seed pulses 206 to the level determined by the temporal and spatial overlap between the stretched signal and the pump pulse.

The gain obtained from the BBO OPA 201 is typically comparable to the gain available from a standard regenerative amplifier pumped by the same laser. A unique feature of OPA that distinguishes it from laser gain media is the fact that no pump absorption and energy storage occurs in the OPA. As a result, the pump beam that remains unconverted in OPA 213 is available for pumping an additional Nd:glass laser amplifier 202. If a small temporal slice of the pump beam was converted in the BBO OPA 201, essentially all of the initial pump beam is available for pumping the final Nd:glass amplifier 202. OPA amplified signal pulse 207 is delayed with respect to the OPA unconverted pump pulse 213 by the pulse width of the residual unconverted pump pulse 213 prior to injection onto the laser amplification stage 202. The delay ensures that the OPA unconverted pump pulse 213 is fully absorbed in the laser amplifier 202 prior to the arrival of the OPA amplified signal pulse 207.

Amplification in Nd:glass is insensitive to the temporal modulation on the pump pulse after its use in OPA, because Nd:glass is a laser medium which stores total integrated pump energy. The final Nd:glass amplifier 202 pumped by the unconverted pump energy from BBO OPA 201 efficiently amplifies the pulse. The amplification in the laser stage 202 is accomplished by introducing the residual unconverted pump pulse 213 and the OPA amplified signal pulse 207 into the Nd:glass laser amplifier 202.

The amplified signal pulse 208 emerging from the Nd:glass laser amplifier 202 is recompressed in the pulse compressor 209. Recompressed amplified pulse 210 emerges from the pulse compressor 209.

Figure 3:
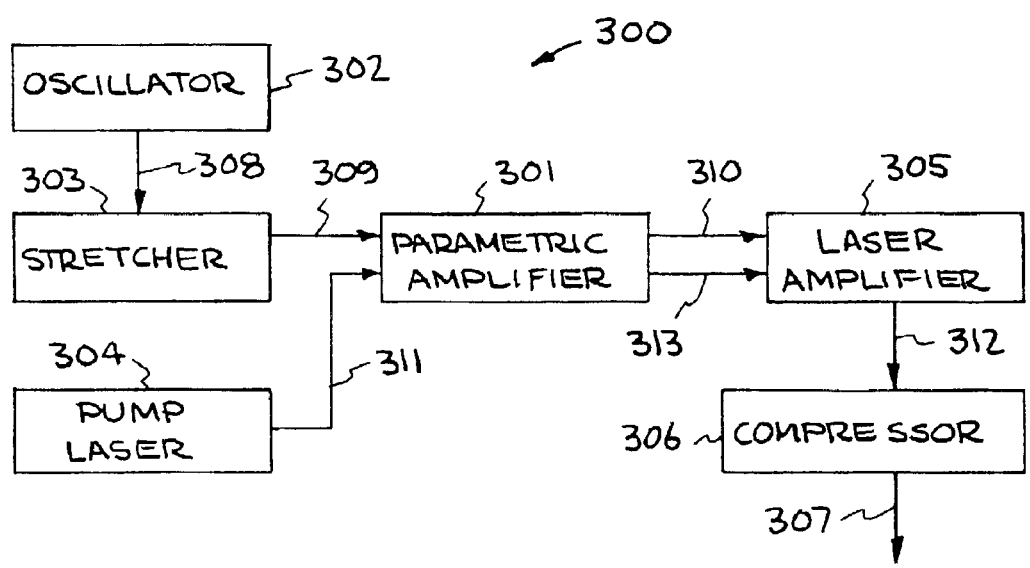
FIG. 3 illustrates another embodiment of a system constructed in accordance with the present invention.

Referring now to FIG. 3, an embodiment of a hybrid chirped pulse amplification system constructed in accordance with the present invention is illustrated. The hybrid chirped pulse amplification system is designated generally by the reference numeral 300. The system 300 provides a chirped pulse amplification system that combines parametric amplification and laser amplification. High efficiency is achieved without the use of electro-optic modulators using a simple tabletop pump laser. The system 300 can relax the requirements on the pump laser and still achieve high conversion efficiency from a standard commercial Q-switched laser.

Referring again to FIG. 3, the hybrid chirped pulse amplification system utilizes a parametric amplifier 301 and a laser amplifier 305. An oscillator 302 produces an output pulse 308 that is directed into a stretcher 303. The stretcher 303 produces a stretched pulse 309.

A pump laser 304 produces a pump laser pulse 311. The stretched pulse 309 and the pump laser pulse 304 are directed into the optical parametric amplifier 301. The optical parametric amplifier 301 produces an optical parametric amplifier output amplified signal pulse 310 and an optical parametric amplifier output unconverted pump pulse 313. The optical parametric amplifier output amplified signal pulse 310 and the optical parametric amplifier output unconverted pump pulse 313 are directed into the laser amplifier 305. OPA amplified signal pulse 307 is delayed with respect to the OPA unconverted pump pulse 313 by the pulse width of the residual unconverted pump pulse 313 prior to injection onto the laser amplification stage 302. The delay ensures that the OPA unconverted pump pulse 313 is fully absorbed in the laser amplifier 302 prior to the arrival of the OPA amplified signal pulse 307.

The laser amplifier 305 produces an amplified signal pulse 312. The amplified signal pulse 312 is directed into a compressor 307. The compressor 306 compresses the amplified signal pulse 312 and produces a recompressed signal pulse 307.

In one embodiment of the invention the laser amplifier is a Ti:sapphire laser amplifier. In another embodiment of the invention the laser amplifier is a Nd:glass laser amplifier. In other embodiments the laser amplifier 305 is made of various laser materials including Cr:LiSAF, Cr:LiCAF, alexandrite, Er:glass, Nd:YLF, dye and other laser amplifier materials.

In an embodiment of the invention the optical parametric amplifier is a beta-barium borate (BBO) optical parametric amplifier. It is to be understood that the OPA 301 can be made of various nonlinear materials, such as beta-barium borate (BBO), lithium borate (LBO), potassium dihydrogen phosphate (KDP), trihydrogen phosphate (KTP), lithium niobate ($LiNbO_3$), periodically poled lithium niobate (PPLN), periodically poled trihydrogen phosphate (PPKTP), potassium titanyl arsenate (KTA), lithium iodate ($LiIO_3$) and other optical parametric amplifier materials.

The requirements for the selection of OPA 301 and laser amplifier 305 materials are as follows: the laser amplifier 305 has to have an absorption line at the pump 304 laser wavelength, laser amplifier 305 has to have a transition at the oscillator 302 wavelength, and OPA has to be phase-matchable at a combination of pump 304 and oscillator 302 wavelengths. Some of the laser materials that can be used in the laser amplifier 305 are Cr:LiSAF, Cr:LiCAF, alexandrite, Er:glass, Nd:YLF, dye, etc.

The operation of the system 300 will now be described. The system 300 provides a hybrid chirped pulse amplification method. The method includes the step of generating an oscillator pulse 308. The oscillator pulse 308 is stretched to produce a stretched seed pulse 309. A pump laser pulse 311 is produced. The stretched pulse 309 and the pump laser pulse 311 are directed into an optical parametric amplifier 301 producing an optical parametric amplifier output amplified signal pulse 310 and an optical parametric amplifier output unconverted pump pulse 313. The optical parametric amplifier output amplified signal pulse 310 and the optical parametric amplifier output unconverted pump pulse 313 are directed into a laser amplifier 305. The laser amplifier 305 produces a laser amplifier output pulse 312. The laser amplifier output pulse 312 is directed into a compressor 306 where it is compressed to provide a recompressed pulse 307.

The present invention provides various embodiments of hybrid chirped pulse amplification systems. The systems comprise an optical parametric amplifier, a short-pulse oscillator, a stretcher operatively connected to the short-pulse oscillator and operatively connected to the optical parametric amplifier, a pump laser operatively connected to the optical parametric amplifier, a laser amplifier operatively connected to the optical parametric amplifier, and a compressor operatively connected to the laser amplifier. Operation of the systems comprise various steps. In embodiments of the invention an oscillator pulse is generated. The oscillator pulse is stretched to produce a stretched oscillator seed pulse. A pump laser pulse is generated. The stretched oscillator seed pulse and the pump laser pulse are directed into an optical parametric amplifier producing an optical parametric amplifier output amplified signal pulse and an optical parametric amplifier output unconverted pump pulse. The optical parametric amplifier output amplified signal pulse and the optical parametric amplifier output laser pulse are directed into a laser amplifier producing a laser amplifier output pulse. The laser amplifier output pulse is compressed to produce a recompressed hybrid chirped pulse amplification pulse.

Embodiments of the invention comprise steps of generating an oscillator pulse, stretching the oscillator pulse to produce a stretched oscillator seed pulse, generating a pump laser pulse, directing the stretched oscillator seed pulse and the pump laser pulse into an optical parametric amplifier and producing an optical parametric amplifier output amplified signal pulse and an optical parametric amplifier output unconverted pump pulse, directing the optical parametric amplifier output amplified signal pulse and the optical parametric amplifier output laser pulse into a laser amplifier and producing a laser amplifier output pulse, and compressing the laser amplifier output pulse to produce a recompressed hybrid chirped pulse amplification pulse. In one embodiment a residual unconverted pump pulse with a pulse width is produced and including the steps of delaying the optical parametric amplifier signal pulse with respect to the optical parametric amplifier output unconverted pump pulse by the pulse width of the residual unconverted pump pulse prior to injection onto the laser amplification stage, ensuring that the optical parametric amplifier output amplified signal pulse is fully absorbed in the laser amplifier prior to the arrival of the optical parametric amplifier output amplified signal pulse in the laser amplifier.

In one embodiment the optical parametric amplifier is a beta-barium borate (BBO) amplifier. In another embodiment the optical parametric amplifier is a lithium borate (LBO) amplifier. In another embodiment the optical parametric amplifier is a potassium dihydrogen phosphate (KDP) amplifier. In another embodiment the optical parametric amplifier is a trihydrogen phospate (KTP) amplifier. In another embodiment the optical parametric amplifier is a lithium niobate ($LiNbO_3$) amplifier. In another embodiment the optical parametric amplifier is a periodically poled lithium niobate (PPLN) amplifier. In another embodiment the optical parametric amplifier is a periodically poled trihydrogen phosphate (PPKTP) amplifier. In another embodiment the optical parametric amplifier is a potassium titanyl arsenate (KTA) amplifier. In another embodiment the optical parametric amplifier is a lithium iodate ($LiIO_3$) amplifier. In another embodiment the optical parametric amplifier is an amplifier comprised of at least one of lithium borate (LBO), or potassium dihydrogen phosphate (KDP), or trihydrogen phosphate (KTP), or lithium niobate ($LiNbO_3$), or periodically poled lithium niobate (PPLN), or periodically poled trihydrogen phosphate (PPKTP), or potassium titanyl arsenate (KTA), or lithium iodate ($LiNbO_3$). In another embodiment the optical parametric amplifier is an amplifier comprised of at least two of lithium borate (LBO), or potassium dihydrogen phosphate (KDP), or trihydrogen phosphate (KTP), or lithium niobate ($LiIO_3$), or periodically poled lithium niobate (PPLN), or periodically poled trihydrogen phosphate (PPKTP), or potassium titanyl arsenate (KTA), or lithium iodate ($LiIO_3$). In one embodiment the laser amplifier is a Ti:sapphire laser amplifier. In another embodiment the laser amplifier is a Nd:glass laser amplifier. In another embodiment the laser amplifier is a Cr:LiSAF amplifier. In another embodiment the laser amplifier is a Cr:LiCAF amplifier. In another embodiment the laser amplifier is an alexandrite amplifier. In another embodiment the laser amplifier is a Er:glass amplifier. In another embodiment the laser amplifier is a Nd:YLF amplifier. In another embodiment the laser amplifier is a dye amplifier. In another embodiment the laser amplifier is an amplifier comprised of at least one of Cr:LiSAF, Cr:LiCAF, alexandrite, Er:glass, Nd:YLF, or dye. In another embodiment the laser amplifier is an amplifier comprised of at least two of Cr:LiSAF, Cr:LiCAF, alexandrite, Er:glass, Nd:YLF, or dye.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A hybrid chirped pulse amplification system, comprising:
   an optical parametric amplifier,
   a short-pulse oscillator,
   a stretcher operatively connected to said short-pulse oscillator and operatively connected to said optical parametric amplifier,
   a pump laser operatively connected to said optical parametric amplifier,
   a laser amplifier operatively connected to said optical parametric amplifier, and
   a compressor operatively connected to said laser amplifier.

2. The hybrid chirped pulse amplification system of claim 1 wherein said optical parametric amplifier is a beta-barium borate (BBO) amplifier.

3. The hybrid chirped pulse amplification system of claim 1 wherein said optical parametric amplifier is a lithium borate (LBO) amplifier.

4. The hybrid chirped pulse amplification system of claim 1 wherein said optical parametric amplifier is a potassium dihydrogen phosphate (KDP) amplifier.

5. The hybrid chirped pulse amplification system of claim 1 wherein said optical parametric amplifier is a trihydrogen phosphate (KTP) amplifier.

6. The hybrid chirped pulse amplification system of claim 1 wherein said optical parametric amplifier is a lithium niobate ($LiNbO_3$) amplifier.

7. The hybrid chirped pulse amplification system of claim 1 wherein said optical parametric amplifier is a periodically poled lithium niobate (PPLN) amplifier.

8. The hybrid chirped pulse amplification system of claim 1 wherein said optical parametric amplifier is a periodically poled trihydrogen phosphate (PPKTP) amplifier.

9. The hybrid chirped pulse amplification system of claim 1 wherein said optical parametric amplifier is a potassium titanyl arsenate (KTA) amplifier.

10. The hybrid chirped pulse amplification system of claim 1 wherein said optical parametric amplifier is a lithium iodate ($LiIO_3$) amplifier.

11. The hybrid chirped pulse amplification system of claim 1 wherein said optical parametric amplifier is an amplifier comprised of at least one of lithium borate (LBO), potassium dihydrogen phosphate (KDP), trihydrogen phosphate (KTP), lithium niobate ($LiNbO_3$), periodically poled lithium niobate (PPLN), periodically poled trihydrogen phosphate (PPKTP), potassium titanyl arsenate (KTA), and lithium iodate ($LiIO_3$).

12. The hybrid chirped pulse amplification system of claim 1 wherein said optical parametric amplifier is an amplifier comprised of at least two of lithium borate (LBO), potassium dihydrogen phosphate (KDP), trihydrogen phosphate (KTP), lithium niobate ($LiNbO_3$), periodically poled lithium niobate (PPLN), periodically poled trihydrogen phosphate (PPKTP), of potassium titanyl arsenate (KTA), and lithium iodate ($LiIO_3$).

13. The hybrid chirped pulse amplification system of claim 1 wherein said laser amplifier is a Ti:sapphire laser amplifier.

14. The hybrid chirped pulse amplification system of claim 1 wherein said laser amplifier is a Nd:glass laser amplifier.

15. The hybrid chirped pulse amplification system of claim 1 wherein said laser amplifier is a Cr:LiSAF amplifier.

16. The hybrid chirped pulse amplification system of claim 1 wherein said laser amplifier is a Cr:LiCAF amplifier.

17. The hybrid chirped pulse amplification system of claim 1 wherein said laser amplifier is an alexandrite amplifier.

18. The hybrid chirped pulse amplification system of claim 1 wherein said laser amplifier is an Er:glass amplifier.

19. The hybrid chirped pulse amplification system of claim 1 wherein said laser amplifier is a Nd:YLF amplifier.

20. The hybrid chirped pulse amplification system of claim 1 wherein said laser amplifier is a dye amplifier.

21. The hybrid chirped pulse amplification system of claim 1 wherein said laser amplifier is an amplifier comprised of at least one of Cr:LiSAF, Cr:LiCAF, alexandrite, Er:glass, Nd:YLF, and dye.

22. The hybrid chirped pulse amplification system of claim 1 wherein said laser amplifier is an amplifier comprised of at least two of Cr:LiSAF, Cr:LiCAF, alexandrite, Er:glass, Nd:YLF, and dye.

23. A hybrid chirped pulse amplification system, comprising:
 oscillator means generating an oscillator pulse;
 stretcher means for receiving said oscillator pulse, stretching said oscillator pulse, and producing a stretched oscillator pulse;
 pump laser means for generating a pump laser pulse; p1 optical parametric amplifier means for receiving said stretched oscillator pulse, for receiving said pump laser pulse, for producing a parametric amplifier output oscillator pulse, and for producing a parametric amplifier output laser pulse;
 laser amplifier means for receiving said optical parametric amplifier output amplified signal pulse, for receiving said optical parametric amplifier output unconverted pump pulse, and for producing a laser amplifier output signal pulse; and
 compressor means for receiving said laser amplifier output signal pulse, compressing said laser amplifier output pulse, and producing a recompressed hybrid chirped pulse amplification pulse.

24. The hybrid chirped pulse amplification system of claim 23 wherein said hybrid chirped pulse amplification system produces a residual unconverted pump pulse with a pulse width and including means for delaying said optical parametric amplifier signal pulse with respect to said optical parametric amplifier output unconverted pump pulse by the pulse width of said residual unconverted pump pulse prior to said laser amplifier, ensuring that said optical parametric amplifier output amplified signal pulse is fully absorbed in said laser amplifier prior to the arrival of said optical parametric amplifier output amplified signal pulse in said laser amplifier.

25. The hybrid chirped pulse amplification system of claim 23 wherein said optical parametric amplifier is a beta-barium borate (BBO) parametric amplifier.

26. The hybrid chirped pulse amplification system of claim 23 wherein said optical parametric amplifier is a lithium borate (LBO) amplifier.

27. The hybrid chirped pulse amplification system of claim 23 wherein said optical parametric amplifier is a potassium dihydrogen phosphate (KDP) amplifier.

28. The hybrid chirped pulse amplification system of claim 23 wherein said optical parametric amplifier is a trihydrogen phosphate (KTP) amplifier.

29. The hybrid chirped pulse amplification system of claim 23 wherein said optical parametric amplifier is a lithium niobate ($LiNbO_3$) amplifier.

30. The hybrid chirped pulse amplification system of claim 23 wherein said optical parametric amplifier is a periodically poled lithium niobate (PPLN) amplifier.

31. The hybrid chirped pulse amplification system of claim 23 wherein said optical parametric amplifier is a periodically poled trihydrogen phosphate (PPKTP) amplifier.

32. The hybrid chirped pulse amplification system of claim 23 wherein said optical parametric amplifier is a potassium titanyl arsenate (KTA) amplifier.

33. The hybrid chirped pulse amplification system of claim 23 wherein said optical parametric amplifier is a lithium Iodate ($LiO_3$) amplifier.

34. The hybrid chirped pulse amplification system of claim 23 (wherein said optical parametric amplifier is an amplifier comprised of at least one of lithium borate (LBO), potassium dihydrogen phosphate (KDP), trihydrogen phosphate (KTP), lithium niobate ($LiNbO_3$), periodically poled lithium niobate (PPLN), periodically poled trihydrogen phosphate (PPKTP), potassium titanyl arsenate (KTA), and lithium iodate ($LiIO_3$).

35. The hybrid chirped pulse amplification system of claim 23 wherein said optical parametric amplifier is an amplifier comprised of at least two of lithium borate (LBO), potassium dihydrogen phosphate (KDP), trihydrogen phosphate (KTP), lithium niobate ($LiNbO_3$), periodically poled lithium niobate (PPLN), periodically poled trihydrogen phosphate (PPKTP), potassium titanyl arsenate (KTA), and lithium iodate ($LiIO_3$).

36. The hybrid chirped pulse amplification system of claim 23 wherein said laser amplifier is a Ti:sapphire laser amplifier.

37. The hybrid chirped pulse amplification system of claim 23 wherein said laser amplifier is a Nd:glass laser amplifier.

38. The hybrid chirped pulse amplification system of claim 23 wherein said laser amplifier is a Cr:LiSAF amplifier.

39. The hybrid chirped pulse amplification system of claim 23 wherein said laser amplifier is a Cr:LiCAF amplifier.

40. The hybrid chirped pulse amplification system of claim 23 wherein said laser amplifier is an alexandrite amplifier.

41. The hybrid chirped pulse amplification system of claim 23 wherein said laser amplifier is an Er:glass amplifier.

42. The hybrid chirped pulse amplification system of claim 23 wherein said laser amplifier is a Nd:YLF amplifier.

43. The hybrid chirped pulse amplification system of claim 23 wherein said laser amplifier is a dye amplifier.

44. The hybrid chirped pulse amplification system of claim 23 wherein said laser amplifier is an amplifier comprised of at least one of Cr:LiSAF, Cr:LiCAF, alexandrite, Er:glass, Nd:YLF, and dye.

45. The hybrid chirped pulse amplification system of claim 23 wherein said laser amplifier is an amplifier comprised of at least two of Cr:LiSAF, Cr:LiCAF, alexandrite, Er:glass, Nd:YLF, and dye.

46. A hybrid chirped pulse amplification method, comprising the steps of:
 generating an oscillator pulse,
 stretching said oscillator pulse to produce a stretched oscillator seed pulse,
 generating a pump laser pulse,
 directing said stretched oscillator seed pulse and said pump laser pulse into an optical parametric amplifier and producing an optical parametric amplifier output amplified signal pulse and an optical parametric amplifier output unconverted pump pulse,
 directing said optical parametric amplifier output amplified signal pulse and said optical parametric amplifier output laser pulse into a laser amplifier and producing a laser amplifier output pulse, and compressing said laser amplifier output pulse to produce a recompressed hybrid chirped pulse amplification pulse.

47. The hybrid chirped pulse amplification method of claim 46 wherein a residual unconverted pump pulse with a pulse width is produced and including the steps of delaying said optical parametric amplifier signal pulse with respect to said optical parametric amplifier output unconverted pump pulse by the pulse width of said residual unconverted pump pulse prior to injection onto said laser amplifier, ensuring that said optical parametric amplifier output amplified signal pulse is fully absorbed in said laser amplifier prior to the arrival of said optical parametric amplifier output amplified signal pulse in said laser amplifier.

48. The hybrid chirped pulse amplification method of claim 46 wherein said optical parametric amplifier is a beta-barium borate (BBO) parametric amplifier.

49. The hybrid chirped pulse amplification method of claim 46 wherein said optical parametric amplifier is a lithium borate (LBO) amplifier.

50. The hybrid chirped pulse amplification method of claim 46 wherein said optical parametric amplifier is a potassium dihydrogen phosphate (KDP) amplifier.

51. The hybrid chirped pulse amplification method of claim 46 wherein said optical parametric amplifier is a trihydrogen phosphate (KTP) amplifier.

52. The hybrid chirped pulse amplification method of claim 46 wherein said optical parametric amplifier is a lithium niobate ($LiNbO_3$) amplifier.

53. The hybrid chirped pulse amplification method of claim 46 wherein said optical parametric amplifier is a periodically poled lithium niobate (PPLN) amplifier.

54. The hybrid chirped pulse amplification method of claim 46 wherein said optical parametric amplifier is a periodically poled trihydrogen phosphate (PPKTP) amplifier.

55. The hybrid chirped pulse amplification method of claim 46 wherein said optical parametric amplifier is a potassium titanyl arsenate (KTA) amplifier.

56. The hybrid chirped pulse amplification method of claim 46 wherein said optical parametric amplifier is a lithium iodate ($LiO_3$) amplifier.

57. The hybrid chirped pulse amplification method of claim 48 wherein said optical parametric amplifier is an amplifier comprised of at least one of lithium borate (LBO), potassium dihydrogen phosphate (KDP), trihydrogen phosphate (KTP), lithium niobate ($LiNbO_3$), periodically poled lithium niobate (PPLN), periodically poled trihydrogen phosphate (PPKTP), potassium titanyl arsenate (KTA), and lithium iodate ($LiO_3$).

58. The hybrid chirped pulse amplification method of claim 46 wherein said optical parametric amplifier is an amplifier comprised of at least two of lithium borate (LBO), potassium dihydrogen phosphate (KDP), trihydrogen phosphate (KTP), lithium niobate ($LiNbO_3$), periodically poled lithium niobate (PPLN), periodically poled trihydrogen phosphate (PPKTP), potassium titanyl arsenate (KTA), and lithium iodate ($LiO_3$).

59. The hybrid chirped pulse amplification method of claim 46 wherein said laser amplifier is a Ti:sapphire laser amplifier.

60. The hybrid chirped pulse amplification method of claim 46 wherein said laser amplifier is a Nd:glass laser amplifier.

61. The hybrid chirped pulse amplification method of claim 46 wherein said laser amplifier is a Cr:LiSAF amplifier.

62. The hybrid chirped pulse amplification method of claim 46 wherein said laser amplifier is a Cr:LiCAF amplifier.

63. The hybrid chirped pulse amplification method of claim 46 wherein said laser amplifier is an alexandrite amplifier.

64. The hybrid chirped pulse amplification method of claim 46 wherein said laser amplifier is an Er:glass amplifier.

65. The hybrid chirped pulse amplification method of claim 46 wherein said laser amplifier is a Nd:YLF amplifier.

66. The hybrid chirped pulse amplification method of claim 46 wherein said laser amplifier is a dye amplifier.

67. The hybrid chirped pulse amplification method of claim 46 wherein said laser amplifier is an amplifier comprised of at least one of Cr:LiSAF, Cr:LiCAF, alexandrite, Er:glass, Nd:YLF, and dye.

68. The hybrid chirped pulse amplification method of claim 46 wherein said laser amplifier is an amplifier comprised of at least two of Cr:LiSAF, Cr:LiCAF, alexandrite, Er:glass, Nd:YLF, and dye.

* * * * *